United States Patent Office

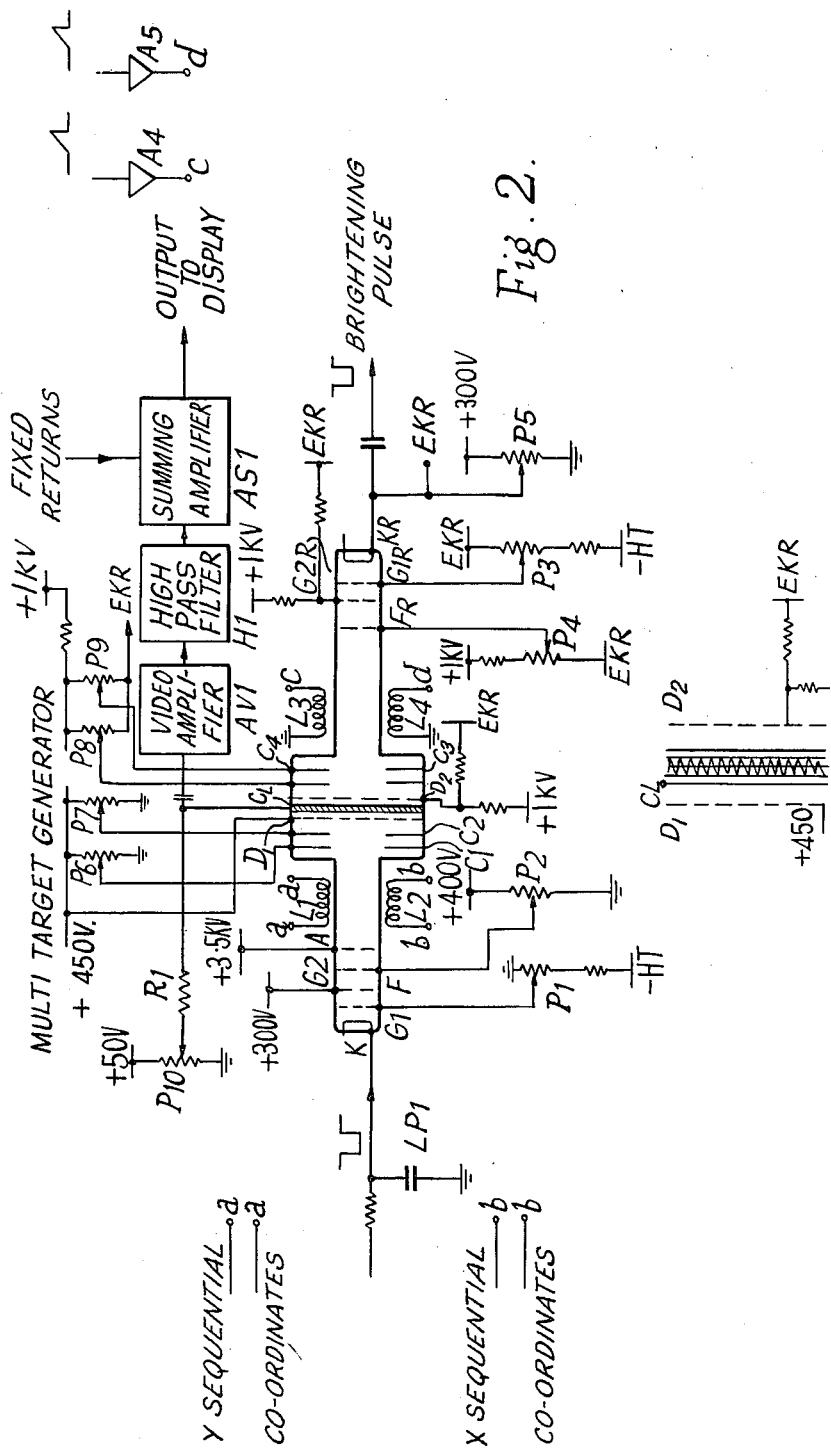

3,221,091
Patented Nov. 30, 1965

3,221,091
RADAR SIMULATION APPARATUS
Kenneth Vincent Franklin, Gossops Green, Crawley, Sussex, and Peter Thomas Ormiston, Three Bridges, Crawley, Sussex, England, assignors to Communications Patents Limited, London, England
Filed Mar. 19, 1962, Ser. No. 180,439
Claims priority, application Great Britain, Mar. 23, 1961, 10,612/61
3 Claims. (Cl. 35—10.4)

This invention relates to radar simulation apparatus, including radar trainer apparatus, in which a large number of targets are simulated.

The object of the invention is to provide apparatus for presenting a simulated radar display, relative to a movable radar scanner such as a rotating P.P.I. display, of a large number of targets, the apparatus including means for presenting a display of the same targets relative to fixed axes.

Means for presenting such a target scatter display, of a large number of targets relative to fixed axes, are known. The known means are suitable for use in the present invention and will not be fully described herein.

Accordingly, the present invention provides radar simulating apparatus comprising radar simulating means for simulating the position of a plurality of targets relative to fixed axes, cathode ray tube display means for displaying the position of said targets singly in sequence, a camera tube for viewing the cathode ray tube display, scanning means comprising camera tube beam deflecting means for repetitive scanning of the cathode ray tube display according to a simulated radar scanner bearing, and radar display means for displaying the positions of a plurality of targets relative to a simulated scanner position, the said cathode ray tube having a persistent screen phosphor providing a display of each target for a period exceeding at least one of the repetitive scanning operations.

Preferably, the apparatus includes means for simulating radar scanner beam-width effects, and for simulating radar countermeasures such as "window" and jamming. Examples of apparatus suitable for simulating these effects are described below.

The cathode ray tube display means and the camera tube viewing means may take the form of a combined unit having a single screen and two guns and two deflection systems for scanning the screen, such as the known combined cathode ray tube and orthicon tube assembly. However, it is preferred to use a high-definition cathode ray tube and separate camera tube with an intermediate optical system, since this combined lends itself more readily to simulation of the radar effects referred to in the preceding paragraph.

In order that the invention may be readily carried into effect, an embodiment thereof will now be described, by way of example, with reference to the accompanying drawings. Various alternative forms of some of the component units will also be described. In the drawings:

FIG. 2 illustrates modifications of a part of the apparatus of FIG. 1;

Figure 1:
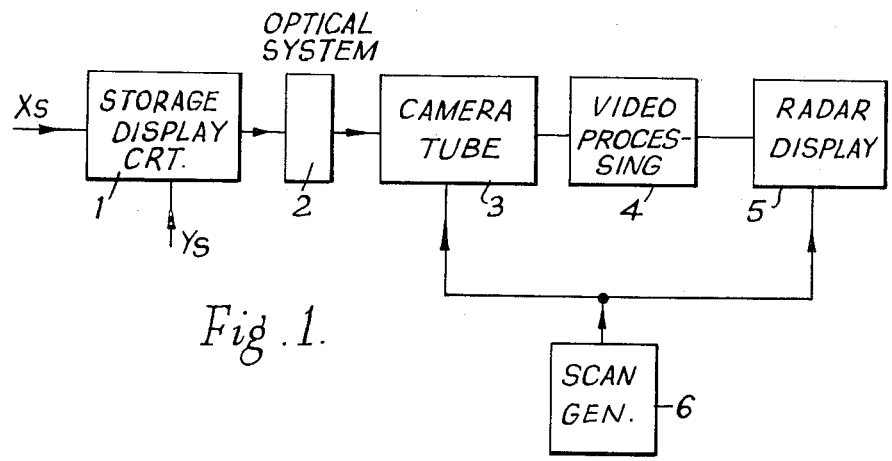
FIG. 1 is a block diagram showing one embodiment of a radar simulating apparatus according to the present invention.

Referring to FIG. 1, the radar simulation apparatus comprises multiple-target pattern simulation means 1 of known form. This target pattern simulation means includes means for generating the co-ordinates to fixed rectangular axes $x_s$ and $y_s$, of each of a plurality of simulated targets, in sequence.

From this information, the target positions are displayed as a pattern, showing the target positions relatively to one another, by a cathode ray tube. The position of each simulated target is shown in sequence. The persistence of the display, due to the use of a long-afterglow phosphor for the cathode ray tube screen, is such that the displayed pattern of targets remains visible for at least two cycles of the co-ordinate sequencing system.

As an alternative to a cathode ray tube providing a display on a fluoroescent screen, a projection type picture tube or a Memortron or Skiatron type tube providing a display by episcope projection, may be used.

The target pattern display is focused onto the screen of a camera tube 3 by means of an intermediate optical system 2 including a lens objective and semi-silvered mirror. The semi-silvered mirror combines an image of the target pattern display with an image of a fixed return pattern, with reference to the same axes, such as returns from a coast-line, aircraft markers and the like, so that both images are focused onto the camera tube screen.

As an alternative to the generation of a fixed return pattern in a different plane from the target pattern and combining the two optically, both may be provided substantially in the plane of the cathode ray tube screen. For this purpose a fluorescent screen generating sodium light, for example, is used together with a complementary transparent screen in which the locations of the fixed returns are shown as a transparent blue image. By means of a light source and separate optical system (not shown), the fluorescent screen is flooded uniformly with a diffused white light. The camera tube has a screen the active band of which includes both the sodium (orange) light of the fluorescent screen and the blue light transmitted by the blue screen, so that the camera tube 3 is responsive to both the target and the fixed return images.

Deflection means comprising a scan generator 6 for the camera tube 3 provide for radial scanning of the combined target and fixed return images in the manner required for a P.P.I. radar display.

The video signal is amplified and is controlled in magnitude at 4. The camera tube beam current is modulated according to the combined image as the image is scanned, and the amplified video signal is fed to a second cathode ray display tube 5. The display tube 5 and camera tube 3 scans are synchronised, so that the output display tube 5 provides a P.P.I. form of display of the target area.

The radar simulation apparatus includes means for simulating the effect of the aerial beamwidth of the radar scanner. These means take one of four alternative forms.

The first form comprises an optical prism arranged in the intermediate optical system 2 between the target pattern display tube 1 and the camera tube 3. The prism is rocked at a frequency not less than 1 cycle/sec. to provide a variation in bearing of the image on the camera tube screen.

According to the second alternative form, the camera tube scanner bearing is modulated electrically at a frequency greater than 1 mc./sec. In this form, the normal X and Y deflection waveforms are modulated by the high frequency signal in any suitable balanced modulator. These modulated waveforms, when applied to the camera deflection circuitry, cause the scanning beam to oscillate from side to side as the beam sweeps out from the center, the amplitude of the oscillation increasing in proportion to the amplitude of the saw tooth waveform provided by scan generator 6.

By the third method, the camera tube 3 is oscillated in rotation at a frequency not less than 1 cycle/sec. This method is substantially like the first method above, except that the camera tube 3, rather than the optical system, is made to oscillate. The effect provided is the same, namely that the display is rotated about the axis common to the display and camera tubes.

By the fourth method, the sequential co-ordinates of the separate targets are modulated at a frequency of about 800 cycles/sec. The target pattern display is then an analogue of the final image required, as regards beamwidth effect. Such an analog would be regarded to represent the arc produced by the display of a finite width radar beam, and could be in the form of a line at right angles to the bearing line. Mathematically, the X and Y deflection signals for such a line would be $$Xs = X + Ky \sin wt.$$
$$Ys = Y - Kx \sin wt.$$

when $X$ = the value of the X coordinate;
$Y$ = the value of the y coordinate;
$K$ = a constant related to the beam width, and
$W$ = the modulating frequency, sufficiently large to provide uniform brilliance of the display. Any suitable circuitry for generating the above signals would be suitable.

The radar simulation apparatus further includes means for simulating radar countermeasures in the form of "window" and jamming.

The output signals from the camera tube 3 do not include height information. It is necessary, therefore, to gate the video signals through to the display, during the period when the beam is passing through the height layer which includes the "window."

A signal storage unit is supplied with an initiating signal representative of the average height above ground level at which simulated "window" is released. This signal is progressively modified at a rate representative of the rate of fall. The resultant signal is representative of the instantaneous average height of the falling "window."

A second signal storage unit receives a signal representative of the radar scanner height. If the scanner is carried by a simulated intercepting aircraft, a signal representative of instantaneous aircraft (i.e., radar scanner) height is fed to this second signal storage unit from known computing means forming part of the radar simulating apparatus. By known analogue computing means, the "window" instantaneous height and aircraft instantaneous height are repeatedly or continuously compared to provide a signal representative of "window" instantaneous height relative to the radar scanner.

The instantaneous scanner elevation angle is derived from computing means and the instantaneous distance from scanner to window, allowing for wind-drift if desired, is computed. The computed product of the sine of scanner angle and scanner-to-"window" distance, gives the height viewed by the scanner beam at the locality of the "window." If the height layer of "window" includes this height, gating signals are generated corresponding to the passage of the simulated scanning beam through the "window." These gating signals are used to control the signal to the output radar display tube 5 to provide a display of the "window."

Spoke jamming originating from any target or targets is simulated by selecting the target concerned. The corresponding co-ordinates $(x, y)$ of this target with reference to the fixed axes are multiplied by a value $f(t)$. This is effected by controlling the slopes of two "bootstrap" type sawtooth generators by the values of $x$ and $y$, respectively. The outputs of the two sawtooth generators are supplied as co-ordinates to the target pattern display tube together with a "white" noise control signal to the modulator electrode of the target pattern display tube. This produces a spoke of noise on the exact bearing of the target selected. The value of $f(t)$ is such as to achieve maximum radar range within the sampling period covering the co-ordinates of all the targets.

As an alternative to the separate target pattern display tube, camera tube and intermediate optical system, preferred, a combined tube having a single screen and two scanning beams may be used. The known combined cathode ray tube and orthicon tube assembly is an example of this alternative. If this alternative is used, it will be evident that simulation of fixed returns by the methods described cannot be used. Of the methods for simulating beamwidth effect described, only that involving modulation of the target co-ordinates can then be employed. The methods of simulating "window" and jamming can both be used with the combined tube.

A circuit for such a combined tube is described below with reference to FIG. 2.

The cathode ray tube optical assembly and camera tube described with reference to FIG. 1 may be replaced by a scan converter tube such as the Dumont K2070 (FIG. 2). This device consists of a writing gun, together with a writing deflection system which defines a charge pattern upon a storage mesh in a vacuum. The charge pattern may be sensed non-destructively by an identical reading assembly which may be used with a different scan pattern.

The sequential relative co-ordinate signals for the various targets are applied to the magnetic deflection coils $L_1$ and $L_2$. A brightening pulse, fed to the cathode in synchronism with the positioning signals, switches on the writing beam current. Interaction between read and write pulses is reduced by writing comparatively slowly. Hence the brightening pulse is applied via a low pass filter $LP_1$.

Control electrode potentials focus and define the writing beam as follows:

Electrode $G_1$ relates to the beam intensity, and is controlled by the potentiometer $P_1$.

Electrode $G_2$ relates to the accelerator and is fixed.

Electrode F relates to the electrostatic focusing and is controlled by the potentiometer $P_2$.

Electrode A relates to the accelerator and is fixed.

Electrode $C_1$ relates to the collimator and is controlled by the potentiometer $P_6$.

Electrode $C_2$ relates to the collimator and is controlled by the potentiometer $P_7$.

Electrode $D_1$ relates to the decelerator and is fixed.

The high velocity writing beam is decelerated immediately in front of the collector CL.

Potentiometer $P_{10}$ controls the collector D.C. potential which determines resolution and erase speed.

An identical reading gun is operated at radar prf. by means of the brightening pulse applied to the cathode. The reading gun D.C. cathode potential is variable (EKR) to allow control of the decay rate of the stored information. The cathode potential EKR is set by control $P_5$.

The reading beam current is determined by the potential of the grid $G_{1r}$ which is set by the control potentiometer $P_3$. The potentiometer $P_4$ is a focusing control. Electrode $G_{2r}$ relates to the accelerator, the potential of which is fixed.

Potentiometers $P_8$ and $P_9$ control the potential of beam collimator electrodes $C_3$ and $C_4$ and hence the background uniformity. Electrode $D_2$ relates to the decelerator, the potential of which is fixed.

A radial scanning pattern is provided by means of magnetic deflection coils $L_3$ and $L_4$ fed with current from amplifiers $A_4$ and $A_5$, which are connected to terminals $c$ and $d$.

Simultaneous writing and reading is provided using a low speed writing operation and a high speed reading operation. The reading beam produces a charge across the collector dielectric capacitance and hence current variations in the signal resistance $R_1$.

The video signal voltage across $R_1$ is amplified in the low noise amplifier $AV_1$ and is applied via an isolating high pass filter $H_1$, to the summing amplifier $S_1$. The filter $H_1$ rejects the writing signals. In the amplifier $S_1$ the video signal from amplifier $AV_1$ is summed with a separately generated ground or fixed returns signal. One method of generating such fixed returns signals is described in British Patent Specification No. 887,641 published January 24, 1962.

Figure 3:
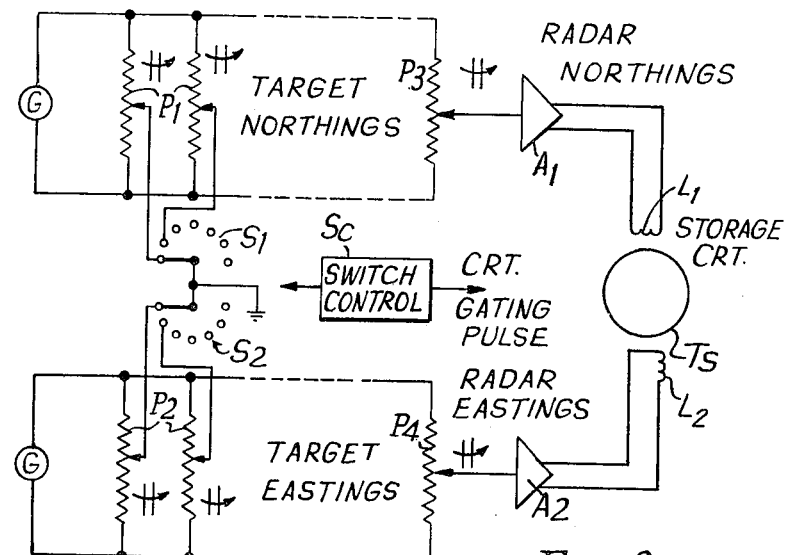
FIG. 3 illustrates in a simplified form a known type of radar simulating means which is used in the apparatus of the present invention.

A suitable co-ordinate generating system for generating the scatter display on the storage cathode ray tube may be similar to known Action Speed Tactical Teacher apparatus, and is schematically illustrated in FIG. 3.

Each target position computing system functions to drive a pair of mechanical shafts whose angular settings at any time represent respectively the eastings and northings ranges of the target concerned, referred to a fixed reference point.

Each shaft drives a potentiometer connected across a floating D.C. potential source. The voltage output of each potentiometer is proportional to the angular setting of the respective driving shaft and hence is proportional to the respective target range.

All the northings potentiometers $P_1$ are connected to one multiple switch $S_1$ and all the eastings potentiometers $P_2$ to a second multiple switch $S_2$. A control unit $S_c$ operates the multiple switches $S_1$ and $S_2$ to select corresponding pairs of potentiometer outputs, in sequence. Each pair of output voltages is supplied to the deflection system of the storage cathode ray tube $T_s$ by connecting the corresponding switch contacts to earth. A potentiometer $P_3$ or $P_4$ across each potential source, driven by a shaft representing respectively radar northings and radar eastings, has its output connected, by way of amplifiers $A_1$ and $A_2$ respectively to Y and X deflection coils $L_1$ and $L_2$. Each pair of range potentials is thus supplied to the tube deflecting means, and a bright-up pulse is supplied to the tube $T_s$ after an interval to permit the circuits to reach a steady state.

Each switch setting of the switches $S_1$ and $S_2$ thus produces one target indication on the screen of the storage tube $T_s$. The relative target positions from the centre of the storage tube screen represent the range of the targets from the simulated radar scanner.

The invention as herein described serves to modify this display to a typical radar display, subject to scanner bearing, beamwidth and countermeasure effects.

Figure 4:
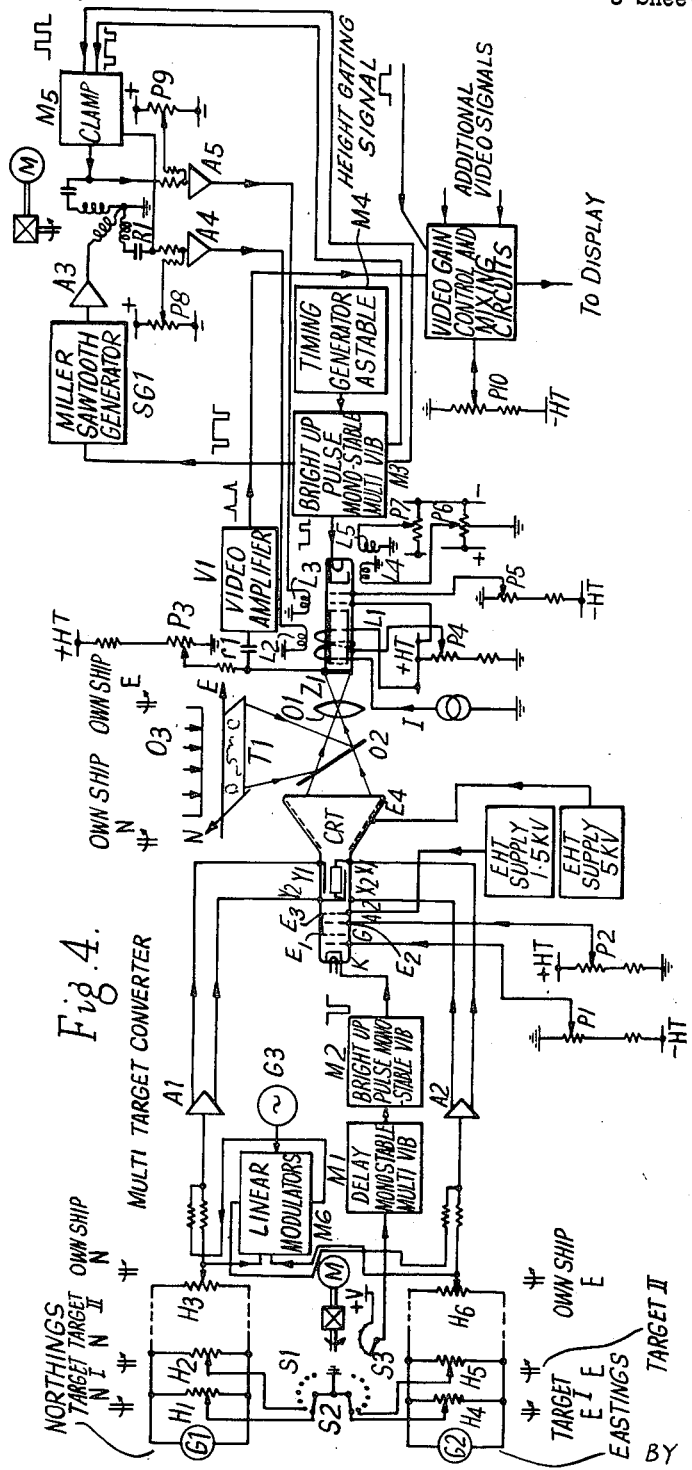
FIG. 4 illustrates in more detail a practical form of some circuits for the apparatus of FIG. 1.

FIG. 4 illustrates more details of some of the practical circuits involved in a preferred embodiment of the invention. The co-ordinate generator system, the storage cathode ray tube controls, the camera tube controls, and the deflection circuits of the camera tube are separately described below in brief with reference to FIG. 4.

D.C. sources $G_1$ and $G_2$ provide floating supplies to helipotentiometers $H_1$, $H_2$, $H_3$ and $H_4$, $H_5$ and $H_6$ respectively. The helipotentiometers are coupled to shafts and provide voltage outputs corresponding to the cartesian co-ordinates of targets I and II and a radar equipped "own" ship.

A constant speed motor M drives switches $S_1$, $S_2$ and $S_3$ via a gearbox. Switches $S_1$ and $S_2$ earth the wipers of the co-ordinate helipotentiometers cyclically. Wafer $S_3$ drives a delay monostable multivibrator $M_1$. The output of this multivibrator is coupled to a further monostable multivibrator $M_2$. The function of these units is to allow the sequencing circuits to settle down before displaying the position signals on the storage cathode ray tube. For this purpose multivibrator $M_2$ produces a "bright-up" pulse which is applied to the cathode of the storage cathode ray tube.

The output signals from the wipers of $H_3$ and $H_6$ consist of a series of D.C. voltage levels which are analogues of the relative cartesian co-ordinates of each target from the radar equipped "own" ship.

The signals from the wipers of $H_3$ and $H_6$ are applied to buffer D.C. amplifiers $A_1$ and $A_2$, together with A.C. signals for simulating the effect of the beamwidth of the aerial.

Input to $A_1 = y + kx \sin wt$.
Input to $A_2 = x + ky \sin wt$.

Where $y$ = relative northing signal.
$x$ = relative easting signal.

These signals are generated in a modulator $M_6$, fed with an 800 c.p.s. input from a source $G_3$ and with the variables $x$ and $y$.

Storage cathode ray tube control

The outputs of amplifiers $A_1$ and $A_2$ are applied in push pull to deflection electrodes $Y_1$, $Y_2$ and $X_1$, $X_2$ of the CRT.

Potentiometer $P_1$ is a storage cathode ray tube brightness control, $P_2$ an electrostatic focus control associated with electrode $E_2$. A 1.5 kv. EHT unit supplies the accelerating anodes $E_1$ and $E_3$ of the storage cathode ray tube, while the 5 kv. EHT unit supplies the PDA electrode $E_4$. The storage cathode ray tube is precision type and has a long persistence phosphor type $P_7$ and has deflection characteristics which are substantially linear.

A scatter target presentation on the face of the storage cathode ray tube is maintained continuously, the targets moving slowly as the helipotentiometers $H_1$ to $H_6$ are rotated.

A transparency $T_1$ contains radar coastline echo return information and is movable on a gantry by shafts synchronised to the "own" ship eastings and northings. Thus the movement of the transparency $T_1$ corresponds to the movements of the radar equipped ship.

A source of diffused light $O_3$ uniformly illuminates the transparency $T_1$, and the transmitted light is collected by the semi-silvered mirror $O_2$, where it is combined with the target picture on the face of the CRT.

Camera tube control

The combined pictures are collected by a lens $O_1$ and focused on the signal plate of a vidicon camera tube $Z_1$. The lens provides a magnification of approximately 0.1 to match the CRT useful screen area to the vidicon signal plate.

The signal plate bias of the camera tube is set to an operating D.C. level of approximately +50 v. by means of potentiometer $P_3$. A focus coil assembly $L_1$ around the mesh of the vidicon operates at a constant current. Focusing is carried out by varying the wall anode potential using the control $P_4$. Potentiometer $P_5$ controls the beam current of the vidicon, brightening pulses being applied to the cathode of the vidicon tube from a monostable multivibrator $M_3$, which is synchronized to a master radar timing astable multivibrator $M_4$.

Potentiometers $P_6$ and $P_7$ control the current flowing in beam alignment coils $L_4$ and $L_5$.

Deflection circuits for the camera tube

Vidicon deflection coils $L_2$ and $L_3$ are driven from amplifiers $A_4$ and $A_5$, which are current generators. The input signals to these amplifiers are derived from two sources (a) D.C. shift currents from controlling potentiometers $P_8$ and $P_9$, and (b) resolved sawtooth waveforms which are derived from a master sawtooth generator $SG_1$, synchronised to the radar scan. The sawtooth is applied to the resolver $R_1$ whose shaft is rotated in synchronism with the radar scanner. Outputs from the stator windings of the resolver correspond to $k(t) \sin \theta$ and $k(t) \cos \theta$ where $k(t)$ is the master sawtooth and angle $\theta$ is the scanner angle with respect to north.

D.C. restoration is applied to the two resolved sawtooth waveforms via clamp unit $M_5$. The clamp unit comprises diode bridge circuits, fed with a balance clamping waveforms generated in the brightening pulse generator $M_3$. Thus the beam of the vidicon is controlled to provide a radial scan as on a radar P.P.I. display. The computed picture is scanned off the signal plate.

When the beam impinges on elements at the rear of the transparent signal plate, where light has caused a charge increase, the beam restores the element to cathode potential. The beam current required to do this then flows into the capacity represented by the signal plate elements and through the resistance $r_1$ where a small signal voltage is developed.

The voltage generated is applied to the video amplifier $V_1$, which comprises a first low noise triode amplifier and several pentode amplifiers in cascade. The video amplifier is arranged to have a rising H.F. characteristic to counteract the falling response of the vidicon signal coupling circuit.

The video signal at the output of the video amplifier is applied to a further amplifier to which additional video signal inputs may be fed if desired. An overall gain control $P_{10}$ is included in this amplifier.

The final video signal is fed to the radar display tube, the deflection circuits of which are connected to operate in synchronism with the scanner circuits.

What we claim is:

1. Radar simulation apparatus providing scan conversion, and comprising radar simulating means for simulating the position of a plurality of targets relative to fixed axes, including means to generate in sequence the coordinates of each of said targets relative to fixed rectangular axes, input means including a first cathode ray tube for displaying the position of said targets singly in sequence, a camera tube for viewing said first cathode ray tube target display, scanning means comprising camera tube beam deflecting means for repetitive scanning of said first cathode ray tube display according to a simulated radar scanner bearing, and output means including a second cathode ray tube for displaying the position of a plurality of targets relative to a simulated scanner position, said first cathode ray tube having a persistent screen phosphor providing a display of each target for a period exceeding at least one of the scanning operations, the form of scanning used for said camera tube and said second ray tube being the same, and further including an intermediate optical system between said first cathode ray tube display means and the camera tube includes a lens objective and a semi-silvered mirrer, the semi-silvered mirror combining the image of the first cathode ray tube display with an image of a fixed return pattern with reference to the same axes, whereby both images are focused onto the camera tube screen.

2. Radar simulation apparatus according to claim 1, wherein the image of the fixed return pattern is generated substantially in the same plane as said first cathode ray tube display, a complementary transparent screen in juxtaposition with the fluorescent screen of the first cathode ray tube, the locations of the fixed return being shown as a transparent image on the transparent screen in a colour, different from the colour of light emitted by the fluorescent screen, whereby said camera tube is responsive to both the target and the fixed return images.

3. Radar simulation apparatus according to claim 1, wherein the deflection means of the camera tube includes means for radial scanning of the combined target and fixed return images in the manner of a P.P.I. radar display in the radar display means.

References Cited by the Examiner
UNITED STATES PATENTS

| | | | |
|---|---|---|---|
| 2,415,981 | 2/1947 | Wolff | 178—6.8 X |
| 2,528,202 | 10/1950 | Wolff | 343—17 X |
| 2,534,610 | 12/1950 | Marcy | 178/6.8 |
| 2,602,921 | 7/1952 | Peters et al. | |
| 2,652,626 | 9/1953 | Garman et al. | 45—10.4 |
| 2,740,205 | 4/1956 | Shamis | 35—10.4 |
| 2,902,670 | 9/1959 | Cutler | 35—10.4 |
| 2,951,297 | 9/1960 | Colker | 35—10.4 |
| 3,060,426 | 10/1962 | Williams | 178—6.8 X |
| 3,068,466 | 12/1962 | Lindley | 343—5 |
| 3,159,705 | 12/1964 | Rhodes et al. | 35—10.4 |

CHESTER L. JUSTUS, *Primary Examiner.*

MAYNARD R. WILBUR, *Examiner.*